United States Patent [19]

Harris

[11] Patent Number: 4,937,811

[45] Date of Patent: Jun. 26, 1990

[54] COMMUNICATION NETWORK

[75] Inventor: John Harris, El Paso, Tex.

[73] Assignee: General Instrument Corporation, New York, N.Y.

[21] Appl. No.: 315,471

[22] Filed: Feb. 24, 1989

[51] Int. Cl.⁵ .............................. H04J 3/02; H04J 3/14; H04J 15/00

[52] U.S. Cl. ........................................ 370/5; 370/16.1; 370/85.15

[58] Field of Search ...................... 370/5, 13.1, 14, 16, 370/85, 86, 90, 87, 88, 5, 16.1, 85.15; 340/825.09, 825.05

[56] References Cited

U.S. PATENT DOCUMENTS

| 4,733,389 | 3/1988 | Pavogel | 370/5 |
| 4,769,807 | 9/1988 | Niwa et al. | 370/16 |
| 4,771,423 | 9/1988 | Ohya et al. | 370/86 |

FOREIGN PATENT DOCUMENTS 198932A 10/1986 European Pat. Off. ................ 370/5

Primary Examiner—Douglas W. Olms
Assistant Examiner—Christopher O. Edwards
Attorney, Agent, or Firm—Barry R. Lipsitz

[57] ABSTRACT

A communication network is provided for transmitting data in a hostile electromagnetic environment. Master and slave units are coupled to a data path by transformer coupling. The slave units can be turned on by applying a DC voltage between transfomer taps at the master, and detecting the voltage at corresponding taps at the slave. Separate pairs of conductors are used to carry signals transmitted by the master and signals transmitted by the slave. The conductors form a closed loop data path enabling the master to selectively transmit data either in a clockwise or counterclockwise direction around the loop. Data may also be received by the master either clockwise or counterclockwise around the loop. In this manner, the master can communicate with the slaves even if there is a break in the data path.

20 Claims, 4 Drawing Sheets

COMMUNICATION NETWORK

BACKGROUND OF THE INVENTION

This invention relates to a communication network over which data is transmitted, and more particularly to a network having master and slave network nodes.

The communication network of the present invention is particularly well suited for operation in a hostile electromagnetic environment, such as in an automobile. Heretofore, communication systems used to couple data between components in automobiles have relied on DC coupling of the signals to the communication network. Many of the systems in an automobile, for example headlights and electric motors to control power windows, produce sharp transient spikes whenever they are turned on or off. These transients often interfere with data being passed along the communication network between the automobile's computer(s) and the devices controlled by the computer(s). In order to deal with such problems, the prior art systems typically transmit the data very slowly, and may use redundant transmission and error checking techniques to overcome the effects of transient voltage spikes and other electromagnetic interference. Alternately, fiber optic techniques have been proposed for carrying data in automotive and similar systems. Fiber optic techniques, however, are generally very expensive with present technology.

It would be advantageous to provide a communication network that is immune to voltage transients and other electromagnetic interference of the type typically found in the automotive environment. It would be further advantageous to provide a communication network that is relatively simple and inexpensive as compared to prior art systems. It would also be advantageous to provide a communication network that will operate even if there is a break in the network cable. The present invention provides such a communication network.

Commonly assigned, copending application Serial No. 07/315,557, filed concurrently herewith and entitled "Alternate Pulse Inversion Encoding Scheme for Serial Data Transmission" discloses a data encoding and decoding method which may be advantageously used to transmit data over the communication network of the present invention, and that application is incorporated herein by reference.

SUMMARY OF THE INVENTION

A communication network is provided for transmitting data. The network includes a master controller, a slave control, and a data path. Means are provided for transformer coupling the master controller to the data path. Means are also provided for transformer coupling the slave control to the data path. A DC voltage is applied between taps in the master controller transformer coupling means, and means are provided for detecting the DC voltage between corresponding taps in the slave control transformer coupling means. The slave control is energized by an output signal produced in response to the DC voltage detecting means.

The data path can comprise a first pair of conductors for carrying signals transmitted from the master controller to the slave control, and a second pair of conductors for carrying signals received from the slave control by the master controller. In such an embodiment, the master controller transformer coupling means comprises a first transformer coupled across the first pair of conductors and a second transformer coupled across the second pair of conductors. The slave control transformer coupling means comprises a third transformer coupled across the first pair of conductors and a fourth transformer coupled across the second pair of conductors. Center taps for the applied DC voltage are provided on the first and second transformers, with corresponding center taps on the third and fourth transformers. In order to effectively cancel interference signals in the network, twisted pair cable is used for the first and second pairs of conductors, and the first, second, third and fourth transformers are balanced.

In a preferred embodiment, the data path is configured as a closed loop comprising a first pair of conductors for carrying signals from the master controller to the slave control, and a second pair of conductors for carrying signals received by the master controller from the slave control. The master controller comprises means for selectively transmitting data on the first pair of conductors in either a clockwise or counterclockwise direction around the loop, and for selectively receiving data on the second pair of conductors from either a clockwise or counterclockwise direction around the loop. The master controller periodically alternates the direction in which it transmits and receives data around the loop. Means are provided for determining if data transmitted by the master controller is not received by the slave control. Means responsive to the determining means enables the master controller to retransmit the unreceived transmitted data in the opposite direction from that in which it was previously transmitted around the loop. Means are similarly provided for sensing if data from the slave control is not received by the master controller. Means responsive to the sensing means enables the master controller to receive unreceived data, in the opposite direction around the loop from that in which the master controller previously attempted to receive it.

A plurality of slave controls may be transformer coupled to the data path, any one of which is capable of malfunctioning and blocking data flow on the data path from any other slave controls. Means are provided for determining, upon such a malfunction, which one of the slave controls has malfunctioned. The determining means may comprise means for turning the slave controls off one at a time, means for monitoring the data path while the slave controls are successively turned off to determine when data flow is no longer blocked, and means for recording which slave control was last turned off before data flow was no longer blocked on the data path. Means for restoring partial operation of the network after one of the slave controls malfunctions turns the malfunctioning slave control off and the other slave controls on.

DETAILED DESCRIPTION OF THE INVENTION

The present invention provides a simple, reliable and cost effective network that allows switch states, analog and other sensors to be read, and lamps, motors, solenoids and other devices to be controlled without the use of a microprocessor at each network node. The protocol of the network is handled by hardware, minimizing the software task of operating the network. The protocol and all logic required for a network node can be implemented by one or more application specific integrated circuits ("ASIC"). A common controller IC can be used for all network nodes. All analog circuits may be provided in a companion module to the controller IC to allow network nodes to be easily and efficiently integrated into application specific assemblies.

In a preferred embodiment, the network of the present invention uses the same ASIC for both the slave and master network nodes. Message transfer, message checking, and address recognition are effected entirely by the state machine logic in the ASIC devices. However, different line interface modules are used to couple the master controller and slave control to the communication network.

Figure 1:
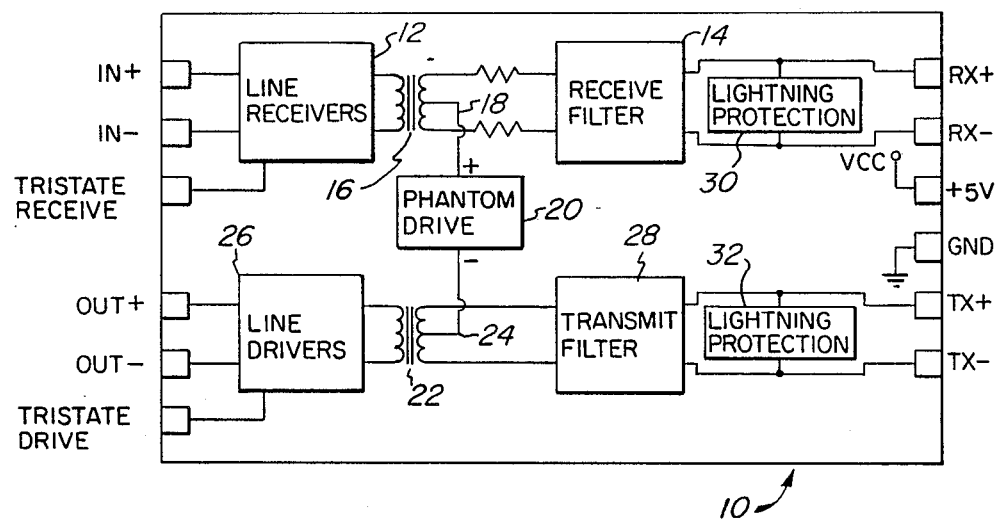
FIG. 1 is a block diagram of a master controller line interface which may be used to interface a master controller to the communication network of the present invention.

A master line interface module 10 is depicted in block diagram form in FIG. 1. Data is input from a controller (such as controller 72 shown in FIG. 3) to line receivers 12. Data is output back to the controller by line drivers 26. Line receivers and line drivers are transformer coupled to a receive filter 14 and transmit filter 28, respectively, by transformers 16 and 22. Transmit filter 28 is coupled to transmit data to the communication network on a first pair of conductors connected to transmitter port terminals TX+ and TX−. Data is received by the master line interface module at receiver port terminals RX+ and RX− which are coupled to the communication network. Lightning protection circuitry 30, 32 protects the master line interface module 10 from high voltage transients, such as those produced by lightning.

A DC power supply 20, also designated "phantom drive" is coupled to center taps 18 and 24 on transformers 16, 22, respectively. By applying a DC voltage between the center taps of these transformers, detector circuits (such as optoisolators) connected between corresponding center taps in slave controls are energized. The output from these detectors is used to turn on the power supply for each slave control, as explained in more detail below.

Figure 2:
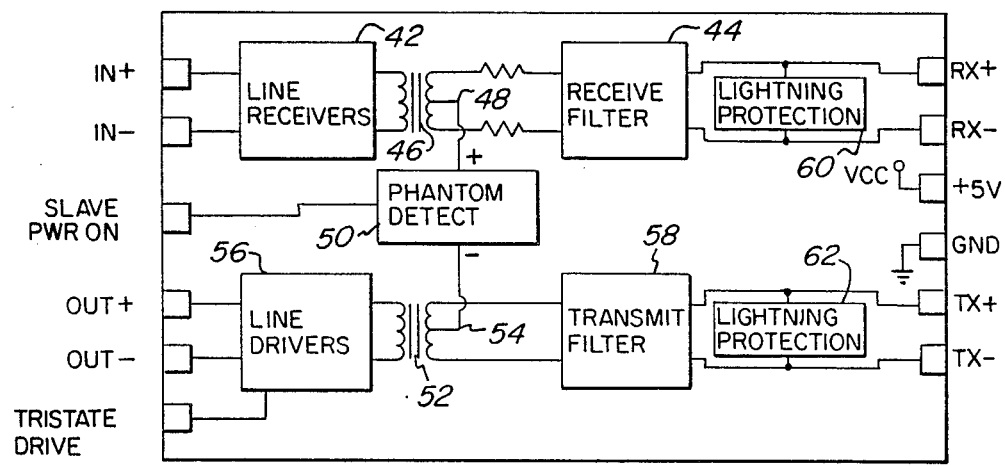
FIG. 2 is a block diagram of a slave line interface which may be used to interface a slave control to the communication network of the present invention.

FIG. 2 depicts a slave line interface module 40 in block diagram form. The slave line interface module couples a slave device to the communication network via the IN+, IN−, OUT+, and OUT− terminals from line receivers 42 and line drivers 56, respectively. Data received at the IN+ and IN− terminals is received by line receivers 42 and decoupled from the communication network by transformer 46. The data is filtered by receive filter 44, and passed on to a device to be controlled by the slave at terminals RX+ and RX−. Examples of devices that may be controlled by the slave in an automotive environment include headlights, power windows, dashboard displays, engine components, transmission components, suspension components, and the like.

Signals from such devices and other sensors are passed back to the master controller via the communication network by the slave line interface module 40. Such signals are filtered by transmit filter 58, and coupled to the communication network of terminals TX+ and TX− from 52, line drivers 56, and terminals OUT+ and OUT− of slave line interface module 40. Phantom detect circuitry 50 detects a DC voltage between the taps 48 and 54 of transformers 46, 52, respectively, and outputs a signal to turn the slave control on. Phantom detect 50 can comprise, for example, a conventional optoisolator circuit to detect the DC voltage at the transformer taps and generate a "power on" output signal. Lightning protection circuits 60, 62 in slave line interface module 40 protect the module from large voltage spikes produced, for example, by lightning.

Transformer coupling of the master controller and slave control to the communication network via transformers 16, 22, 46 and 52 provides various advantages. Where the communication network comprises a first pair of twisted conductors for carrying signals transmitted from the master controller to the slave control, and a second twisted pair of conductors for carrying signals received from the slave control by the master controller, and the transformers are constructed to optimize balance, radiation of line signals is reduced by flux cancellation. Further, susceptibility to both magnetic and electric field interference is reduced by common mode rejection. The flow of differential ground currents through the network cable is also avoided. If the transformers are perfectly balanced, the voltage signals produced by such currents flowing through the vehicle chassis ground are seen as common mode signals that are cancelled completely. Thus, load switching transients cannot use the network data cable as an antenna to radiate RF interference, that could create malfunctions in the automobile electronics.

The input and output impedances are different for the master and slave line interface modules. The slave module both drives and receives at taps on a party line. The master module drives and receives at the end of a line and is required to match the line characteristic impedance.

In the simplest form of a communication network in accordance with the present invention, a single master line interface module would drive and receive at one end of the network cable. The other end of the network cable would be terminated in resistors. In such an embodiment, if the network cable were cut at some point, all slave nodes beyond the cut would not be accessible by the master. This could create a dangerous situation, particularly in an automotive environment.

Figure 3:
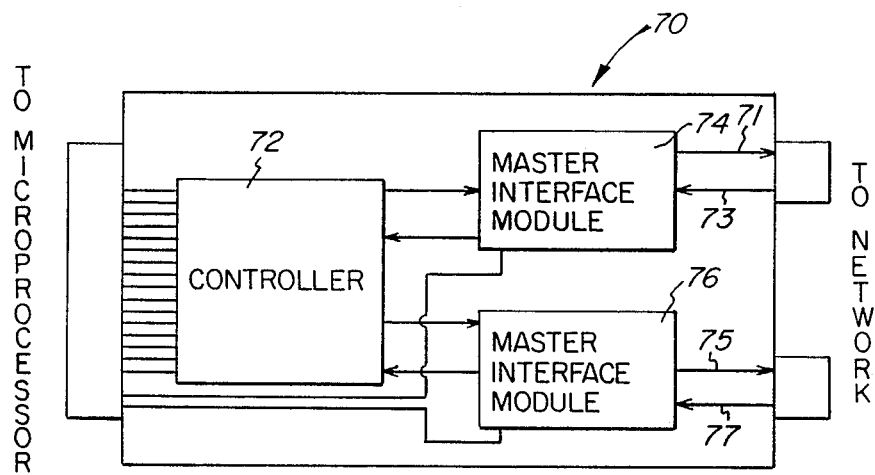
FIG. 3 is a block diagram of a master controller using two master line interfaces.

The communication network of the present invention overcomes such risks by providing a closed loop data path that enables the master controller to communicate with a node by transmitting in either a clockwise or counterclockwise direction around the loop. This can be accomplished using either redundant master interface modules or by using two completely separate masters, one coupled to each end of the network. A dual master interface configuration is shown in FIG. 3. The master controller 70 comprises a controller 72, which may be an ASIC device. Controller 72 is configured to communicate with a system microprocessor and to control the transfer of data to and from the network via master interface modules 74 and 76. Modules 74 and 76 are equivalent to the master line interface module 10 shown in greater detail in FIG. 1. These modules are transformer coupled to the communication network as described above. Module 74 is connected to one end of the network cable via first transmitter port 71 and first receiver port 73, and module 76 to the other end thereof via second transmitter port 75 and second receiver port 77. Either module 74 or 76 can be selected by controller 72 before a message transmission takes place.

If the selected master interface module is alternated before each transmission from the master controller, alternate messages will be sent in opposite directions along the network cable. If a break occurs in the cable, then some messages will either not return a reply or not be acknowledged by the slave node. An error routine can be used to detect or sense such message failure, verify that the failure was caused by a cable break (e.g., by polling the slaves and determining which signals get through from which direction), and cause the master controller to automatically resend these messages. When a message is resent, it will be transmitted via the master interface module not previously used for that message, i.e., in the opposite direction along the cable. Therefore, the message will reach the intended slave. Automatic recovery from a cable break is thereby provided. The error routine can report the fault to the controller 72, which can then determine the position of the break by transmitting successive messages to each slave in one direction along the cable, determine the last slave which successfully receives a message, and thereby locate the position of the break.

Figure 4:
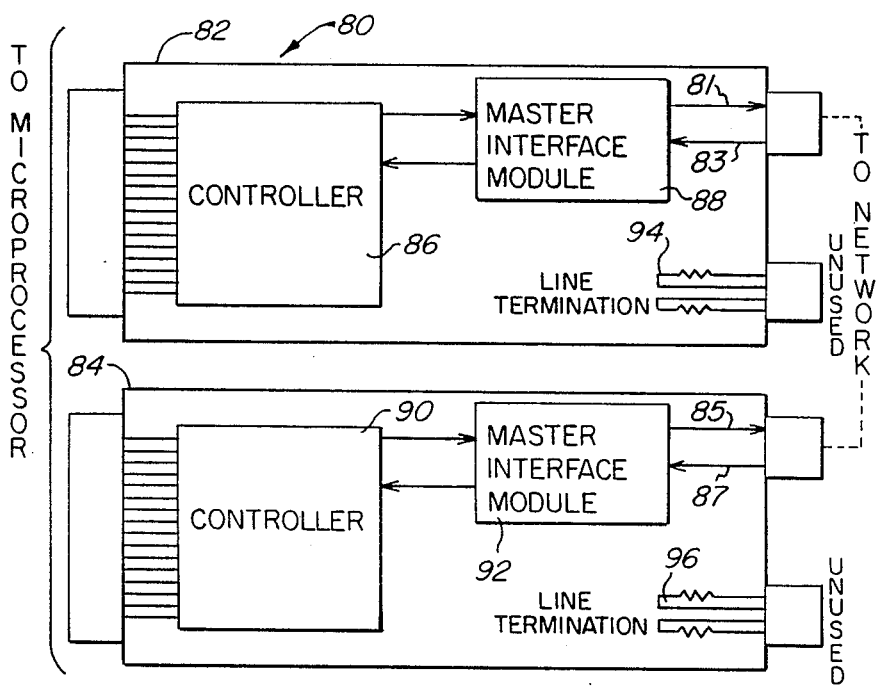
FIG. 4 is a block diagram of a redundant master controller which may be used in connection with the present invention.

FIG. 4 illustrates the use of dual masters to assure that messages will reach an intended slave regardless of a single break in the communication network cable. Master controller 80 includes masters 82 and 84. Master 82, which includes controller 86 and master interface module 88 is coupled to one end of the network cable via first transmitter port 81 and first receiver port 83. The physical assembly of master 82 is the same as that shown in FIG. 3 for master controller 70, except that the second master interface module is deleted. Termination resistors 94 are provided at the unused terminals.

Similarly, master 84 comprises controller 90 and master interface module 92 coupled to the other end of the network cable via second transmitter port 85 and second receiver port 87. Line termination resistors 96 are coupled to the unused terminals. The use of dual masters in the master controller 80 of FIG. 4 further reduces the possibility that the failure of any one component will ruin the integrity of the network.

Figure 5:
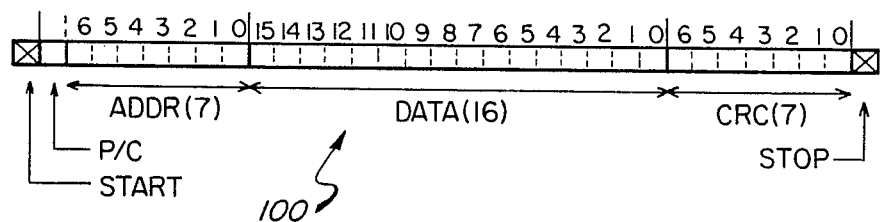
FIG. 5 is a schematic illustration of a message format which may be used for data transmitted over, the communication network of the present invention.

In the preferred embodiment, the bit organization of all messages carried on the communication network is the same. A typical message format that may be used is shown in FIG. 5. Message format 100 commences with a start bit, which may be a one-bit code violation inserted into the transmitted data. The second bit, designated "P/C", identifies the message type, i.e., whether the message is a poll of the slaves or a command to a slave. A global or node address is carried as a seven-bit byte "ADDR". Sixteen bits of data follows, which can be either input or output data. After the data is sent, seven CRC bits are sent for use in connection with a cyclic redundancy code error checking routine. Finally, a single stop bit, which comprises a code violation in the transmitted data, is transmitted.

The communication network of the present invention can be used to implement Class C systems, Class B systems, or Class A systems. Examples showing implementation of each type of system in an automobile follow. It should be appreciated that the present invention is not limited to use in automobiles or other vehicles, but can be used in any application where high integrity data communication is necessary.

Figure 6:
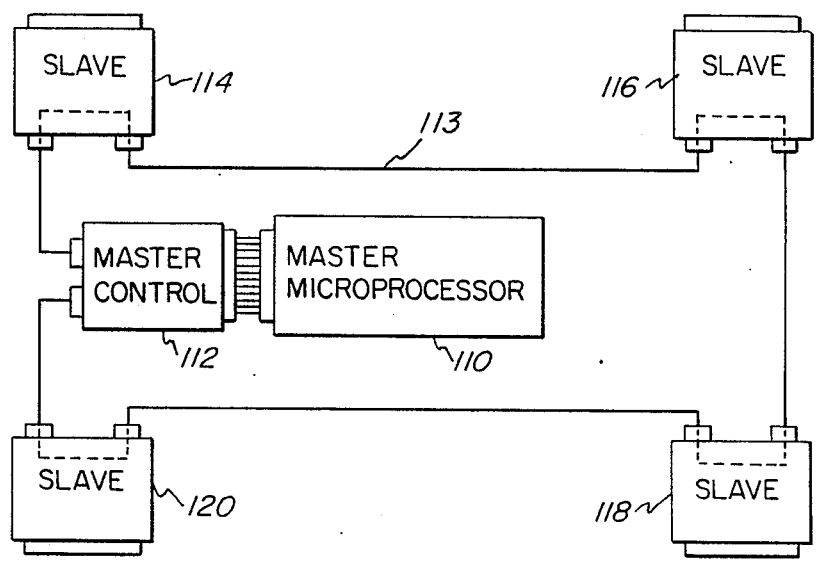
FIG. 6 is a block diagram of a communication network in accordance with the present invention configured as a Class C system.

FIG. 6 illustrates a communication network in accordance with the present invention to provide a Class C system. In this system, remote input/output ports are provided to the system microprocessor (e.g., the main system processor used in an automobile). By providing 16-bit wide remote I/O ports with a real data transfer rate that exceeds one megabit/second, the Class C system of FIG. 6 allows a single microprocessor to control high speed real time systems for applications such as smart suspensions and four wheel steering systems. In this example, a twelve-bit digital to analog converter and associated multiplexer can be manipulated at a slave node in exactly the same way as if it were connected directly to an I/O port on the microprocessor.

Referring to FIG. 6, a hypothetical system in accordance with the present invention could have four slave nodes, 114, 116, 118 and 120, with each controlling a twelve-bit digital to analog converter and a four-way multiplexer for analog sensors (not shown) coupled to the slave, and four digital output drivers for control valves. All four sensors could be read at each node and a command issued to change the states of the control valves at each node within a short time period, e.g., one millisecond. Psuedo code for software to accomplish this would be as follows:

```
BEGIN
    For SENSOR = 1 to 4
        For SLAVE = 1 to 4
            Send Command to Set MUX
                [14 uSec × 4 = 56 uSec.]
        Next SLAVE
        For SLAVE = 1 to 4
            Send Command to Start Conversion
                [14 uSec × 4 = 56 uSec.]
        Next SLAVE
        For SLAVE = 1 to 4
            Poll to Read A/D
                [32 uSec × 4 = 128 uSec.]
        Next SLAVE
    Next SENSOR
    Decide on Control Valve Settings
    [Application Determines Timing]
    FOR SLAVE = 1 to 4
        Send Command to Set Control Valves
            [14 uSec × 4 = 56 uSec.]
    Next SLAVE
END
```

The above pseudo code allows 40 microseconds each, for the multiplexer to settle and analog/digital conversion. A command takes 7.75 microseconds to transmit and a poll takes 18 microseconds to return the reply. The assembly language input and output routines to drive the network each require nine instructions. Allowing 1.5 microseconds per instruction gives a total of 13.5 microseconds per routine. Thus, it is these routines that determine the command times. The poll time is determined by adding the transmission time to that of the reply routine.

In the system of FIG. 6, the slaves are coupled by the communication network 113 to master control 112, which communicates with the system microprocessor 110.

Figure 7:
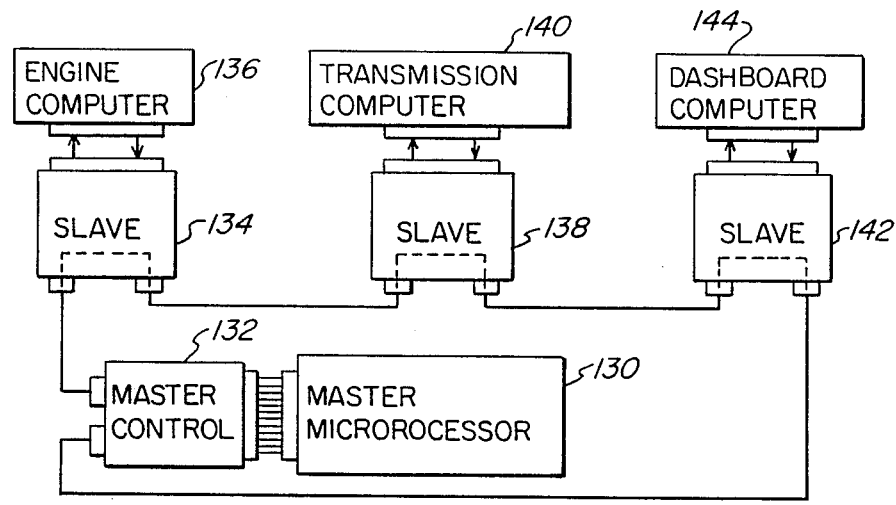
FIG. 7 is a block diagram of a communication network in accordance with the present invention configured as a Class B system.

An example of a Class B system is shown in FIG. 7. Class B systems are used for data transfer or data sharing between microprocessor controlled assemblies. The master microprocessor 130 communicates with master control 132. Slaves 134, 138, and 142 are coupled to the master control 132 over the communication network. An engine computer 136 communicates with slave 134. A transmission computer 140 communicates with slave 138. A dashboard computer 144 communicates with slave 142.

In operation, engine RPM is known to the engine computer, and this data can be shared over a bus by both the transmission computer 140 and dashboard computer 144. The communication network acts as a packet switching system to implement the Class B network. Software in the microprocessor at the master node handles conflict resolution and message priority.

The underlying message format in the system of FIG. 7 is transparent to the network. Thus, any eight-bit character oriented protocol, such as J1587 can be used. Two messages, with 16 data bits, are used to frame a variable length packet, with the eight-bit characters packed two per message to form the body of the packet. The start framing message gives the priority and the packet length. The stop framing message contains an eight-bit sumcheck of the whole packet.

All of the slave nodes are polled to determine if one or more slave microprocessors are ready to send a message. If a message is waiting, then the poll reply will be the start frame message. Otherwise, all the data bits in the reply will be zero. If there is more than one packet waiting, the priority code is used to select the packet for transmission.

A command message is sent to the selected slave node to indicate that the packet transfer has started. The master repetitively polls the slave and broadcasts the poll reply as a command with a global address. All slaves read these commands into a packet buffer and determine from the contents of the package what action, if any, is required.

Figure 8:
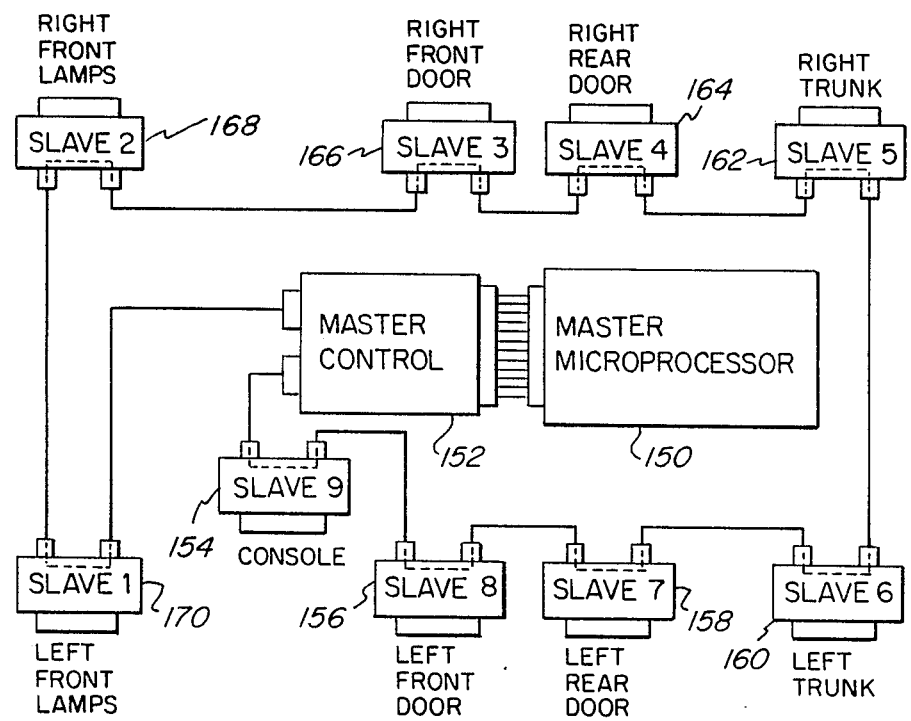
FIG. 8 is a block diagram of a communication network in accordance with the present invention configured as a Class A system.

FIG. 8 illustrates an example of a Class A system, wherein master microprocessor 150 communicates via master control 152 to a plurality of slaves 170, 168, 166, 164, 162, 160, 158, 156, and 154. Each slave controls a different function in the automobile. For example, slave 170 controls the left front lamps. Slave 168 controls the right front lamps. The driver console is controlled by slave 154. Slaves 156, 158, 164, and 166 monitor and control door functions, while slaves 160 and 162 monitor and control trunk functions.

The introduction of electronic control in automobiles has complicated the function of body wiring, requiring interaction between some of the body wiring components and microprocessor controlled assemblies. In the system of FIG. 8, individual messages transmitted over the communication network are associated with components such as lamps, switches, or motors. Output message bits are used to energize loads. Input message bits are used to read the state of switches or the status of microprocessor controlled power devices. In a preferred embodiment, components are connected as groups by location, rather than function, to form slave nodes handling up to a predetermined number of inputs and outputs, e.g., sixteen inputs and sixteen outputs.

A microprocessor at the master node provides cross connections between components by "virtual circuit" routines. Each of these routines is dedicated to a specific function such as turn signals, window lifts, or door locks. Lower level routines sequentially poll the slave nodes, and detect changes in the replies.

It will now be appreciated that the present invention provides a communication network particularly suited for use in hostile electromagnetic environments, such as an automobile. Although automotive applications have been used as examples in the present specification, the invention is in no way limited to automotive or similar applications.

The communication network utilizes a master/slave approach, and separates the master and slave transmitters on to separate pairs of conductors. In this manner, a single clock source at the master node can be used for the whole network. The slaves are clocked by either idle bits or data bits transmitted by the master, reducing both the cost and complexity of the system. The risk of false outputs is reduced because the transmission of one slave is not received by the others.

The communication network can be run at a high data rate, such as four megabits per second. This enables all systems in an automobile, for example, to be checked in ten microseconds after the car is started. Thus, there is no need for a driver to wait before the car can be put in gear. All of the slave nodes can be turned off by the master controller when the car is turned off. This prevents power drain from the automobile's battery when the car is parked. The slaves are turned back on upon starting the car by detection of a "phantom" voltage appearing between taps on the transformers coupling the slaves to the network.

Although the invention has been described in connection with various examples, those skilled in the art will appreciate that additions, deletions, or substitutions can be made thereto without departing from the spirit and scope of the invention as set forth in the following claims.

What is claimed is:

1. A communication network for transmitting data comprising:
   a master controller;
   a slave control;
   means for transformer coupling said master controller to said data path;
   means for transformer coupling said slave control to said data path;
   means for applying a DC voltage between taps provided in the master controller transformer coupling means when the master controller is energized;
   means for detecting said DC voltage between corresponding taps provided in the slave control transformer coupling means and producing a responsive control signal; and
   means for energizing the slave control in response to said control signal.

2. The network of claim 1 wherein said data path comprises a first pair of conductors for carrying signals transmitted from the master controller to the slave control, and a second pair of slave conductors for carrying signals received from the slave control by the master controller;

said master controller transformer coupling means comprising a first transformer coupled across said first pair of conductors an da second transformer coupled across said second pair of conductors; and said slave control transformer coupling means comprising a third transformer coupled across said first pair of conductors and a fourth transformer coupled across said second pair of conductors.

3. The network of claim 2 wherein said taps provided in the master controller transformer coupling means are center taps on the first and second transformers; and said corresponding taps are center taps on the third and fourth transformers.

4. The network of claim 2 wherein said first and second pairs of conductors are twisted pairs.

5. The network of claim 4 wherein said first, second, third and fourth transformers are balanced.

6. The network of claim 1 wherein said data path is a closed loop comprising a first pair of conductors for carrying signals from the master controller to the slave control, and a second pair of conductors for carrying signals received by the master controller from the slave control;

said master controller comprising means for selectively transmitting data on said first pair of conductors in either a clockwise or counterclockwise direction around the loop, and for selectively receiving data on said second pair of conductors from either a clockwise or counterclockwise direction around the loop.

7. The network of claim 6 wherein said master controller periodically alternates the direction in which it transmits and receives data around said loop.

8. The network of claim 6 further comprising:

means for determining if data transmitted by said master controller is not received by said slave control, and means responsive to said determining means for enabling said master controller to retransmit unreceived transmitted data, in the opposite direction from that in which it was previously transmitted around said loop.

9. The network of claim 8 further comprising:

means for sensing if data from said slave control is not received by said master controller, and means responsive to said sensing means for enabling said master controller to receive unreceived data, in the opposite direction around the loop from that in which the master controller previously attempted to receive it.

10. The network of claim 6 further comprising:

means for sensing if data from said slave control is not received by said master controller, and means responsive to said sensing means for enabling said master controller to receive unreceived data, in the opposite direction around the loop from that in which the master controller previously attempted to receive it.

11. The network of claim 1 further comprising:

a plurality of slave controls transformer coupled to said data path, any one of said slave controls capable of malfunctioning and blocking data flow on said data path from any other slave controls; and means for determining, upon such a malfunction, which one of said slave controls has malfunctioned.

12. The network of claim 11 wherein said determining means comprises:

means for turning said slave controls off one at a time;

means for monitoring said data path while said slave controls are successively turned off to detect when data flow is no longer blocked on said data path; and means for recording which slave control was last turned off before data flow was no longer blocked on the data path.

13. The network of claim 12 further comprising:

means for restoring partial operation of said network after one of said slave controls malfunctions by turning said malfunctioning slave control off and the other slave controls on.

14. A communication network for transmitting data comprising:

a master controller having first and second transmitter ports and first and second receiver ports;

a slave control;

a first closed loop data path coupled between the first and second transmitter ports of said master controller and to said slave control for carrying signals from the master controller to the slave control; and a second closed loop data path coupled between the first and second receiver ports of said master controller and to said slave control for carrying signals from the slave control to the master controller;

said master controller comprising means for transmitting data from said first or second transmission port to selectively effect data transmission in either a clockwise or counterclockwise direction around the first loop, and for receiving data at said first or second receiver port to selectively effect data reception in either a clockwise or counterclockwise direction around the second loop.

15. The network of claim 14 wherein said master controller periodically alternates the direction in which it transmits and receives data around said first and second data paths.

16. The network of claim 14 further comprising:

means for determining if data transmitted by said master controller is not received by said slave control when sent in one direction around said first data path, and means responsive to said determining means for enabling said master controller to retransmit unreceived transmitted data, in the opposite direction from that in which it was previously transmitted around said first data path.

17. The network of claim 16 further comprising:

means for sensing if data from said slave control is not received by said master controller when sent in one direction around said second data path, and means responsive to said sensing means for enabling said master controller to receive unreceived data, in the opposite direction around the second data path from that in which the master controller previously attempted to receive it.

18. The network of claim 14 further comprising:

means for sensing if data from said slave control is not received by said master controller when sent in one direction around said second data path, and means responsive to said sensing means for enabling said master controller to receive unreceived data, in the opposite direction around the second data path from that in which the master controller previously attempted to receive it.

19. The network of claim 18 comprising a plurality of slave controls coupled to said first and second data paths for receiving and sending signals from the master controller.

20. The network of claim 14 comprising a plurality of slave controls coupled to said first and second data paths for receiving and sending signals from the master controller.

* * * * *